March 15, 1955 L. ROCKSTROM ET AL 2,704,208

PRINTER SLOTTER BLANK FEED

Filed March 25, 1952 14 Sheets-Sheet 1

INVENTORS
Edward J. Winship and
Leonard Rockstrom
By Edmonds W. Y. Clark
Attorney March 15, 1955 L. ROCKSTROM ET AL 2,704,208

PRINTER SLOTTER BLANK FEED

Filed March 25, 1952 14 Sheets-Sheet 2

INVENTORS
Edward J. Winship and
Leonard Rockstrom
BY
Thomas W. Y. Clark
Attorney March 15, 1955 L. ROCKSTROM ET AL 2,704,208

PRINTER SLOTTER BLANK FEED

Filed March 25, 1952 14 Sheets-Sheet 3

INVENTORS.
Edward J. Winship and
Leonard Rockstrom
BY [signature]
Attorney

March 15, 1955 L. ROCKSTROM ET AL 2,704,208

PRINTER SLOTTER BLANK FEED

Filed March 25, 1952 14 Sheets-Sheet 4

INVENTORS
Edward J. Winship and
Leonard Rockstrom
BY
Thomas W. Clark
Attorney

March 15, 1955 L. ROCKSTROM ET AL 2,704,208

PRINTER SLOTTER BLANK FEED

Filed March 25, 1952 14 Sheets-Sheet 5

INVENTORS
Edward J. Winship and
Leonard Rockstrom

BY Thomas W. J. Clark

ATTORNEY

INVENTORS
Edward J. Winship and
Leonard Rockstrom
BY Thomas W. Y. Clark
attorney INVENTORS
Edward J. Winship and
Leonard Rockstrom.
BY
Thomas W. Y. Clark
Attorney March 15, 1955 L. ROCKSTROM ET AL 2,704,208

PRINTER SLOTTER BLANK FEED

Filed March 25, 1952 14 Sheets-Sheet 8

INVENTORS
Edward J. Winship and
Leonard Rockstrom
By Thomas W. Y. Clark
attorney March 15, 1955 L. ROCKSTROM ET AL 2,704,208

PRINTER SLOTTER BLANK FEED

Filed March 25, 1952 14 Sheets-Sheet 9

INVENTORS.
Edward J. Winship and
Leonard Rockstrom
BY Thomas W. Y. Clark
Attorney March 15, 1955 L. ROCKSTROM ET AL 2,704,208

PRINTER SLOTTER BLANK FEED

Filed March 25, 1952 14 Sheets-Sheet 10

Inventors

Edward J. Winship and
Leonard Rockstrom

By Thomas W. Clark

Attorney

PRINTER SLOTTER BLANK FEED

Filed March 25, 1952 14 Sheets-Sheet 11

INVENTORS
Edward J. Winship and
Leonard Rockstrom
BY
Thomas W. Y. Clark
Attorney INVENTORS
Edward J. Winship and
Leonard Rockstrom
BY [signature]
Attorney March 15, 1955 L. ROCKSTROM ET AL 2,704,208

PRINTER SLOTTER BLANK FEED

Filed March 25, 1952 14 Sheets-Sheet 13

INVENTORS.
Edward J. Winship and
Leonard Rockstrom
BY Thomas W. Y. Clark
attorney March 15, 1955 L. ROCKSTROM ET AL 2,704,208

PRINTER SLOTTER BLANK FEED

Filed March 25, 1952 14 Sheets-Sheet 14

INVENTORS
Edward J. Winship and
Leonard Rockstrom
BY Thomas W.Y. Clark
ATTORNEY

United States Patent Office 2,704,208

Patented Mar. 15, 1955

2,704,208

PRINTER SLOTTER BLANK FEED

Leonard Rockstrom, Laurelton, N. Y., and Edward J. Winship, Baltimore County, Md., assignors to F. X. Hooper Company, Inc., a corporation of Maryland Application March 25, 1952, Serial No. 278,393

13 Claims. (Cl. 271—10)

This invention relates to an improvement in the feed mechanism for a printer-slotter.

Printer-slotters are primarily designed to print and slot corrugated board and other stiff boards for the making of cartons and other purposes. The board is usually fed with continuously operating reciprocating or otherwise movable members which pull the lowest board from a pile or stack and feed it to the pull rolls which in turn pass the board to the printing and slotting rolls of the machine. Since it is imperative to avoid the overlapping of boards in the machine, wider boards, in the direction of travel through the machine, have been fed on each alternate stroke of the feeding members.

The boards have now become so wide, in the direction of feed and also so long, transverse of the feed, that they can not be fed from a stack but they must be lined up on the feed table by hand and then released to the feed mechanism to assure their even feeding and to avoid their mutilation by the feeding mechanism.

The instant invention relates to certain improvements on the old skip feed mechanism as well as the invention of new instrumentalities to accommodate the feed for manual operation for unusually large and heavy board. Among the advantages of the machine are to adjust the pull rolls to adapt them to boards of different thickness. Also the gate, which holds back the remainder of the stack when the boards are fed automatically from the bottom and which aids in aligning the boards when they are fed manually, has been improved to adjust it vertically for varying thicknesses of board and to permit its lateral adjustment for different lengths, transverse of the feed. The upper pull roll and the gate vertical adjustment can be combined and the upper pull rod has been resiliently mounted to allow for accommodation of partially warped boards or for boards varying in thickness over portions of their area. The gate has further been improved so that it may be lowered in contact with the material support or feed table so that the gate may be used as an alignment means for the manual alignment of the large blanks of stiff board. After using the gate to align the blanks the gate is raised to its adjusted height, adjustment being possible both in cooperation with the upper pull roll as well as separately. The gate is also mounted resiliently so that when it is brought down to the blank support it may give to insure register.

In addition to the usual means for raising the rear edge of the stack of blanks, an additional means is provided to raise the blank rear edge support bar so that when hand feeding or at any other desired time, the blank or blanks may be kept from engagement with the machine feed. Coordinated means are likewise provided to insure the raising of the gate prior to the lowering of this additional blank raising mechanism so that the blanks will never be fed against a closed gate.

Other improvements and advantages of the instant invention will be apparent from the following description and the accompanying drawings forming a part hereof and in which.

Figure 1:
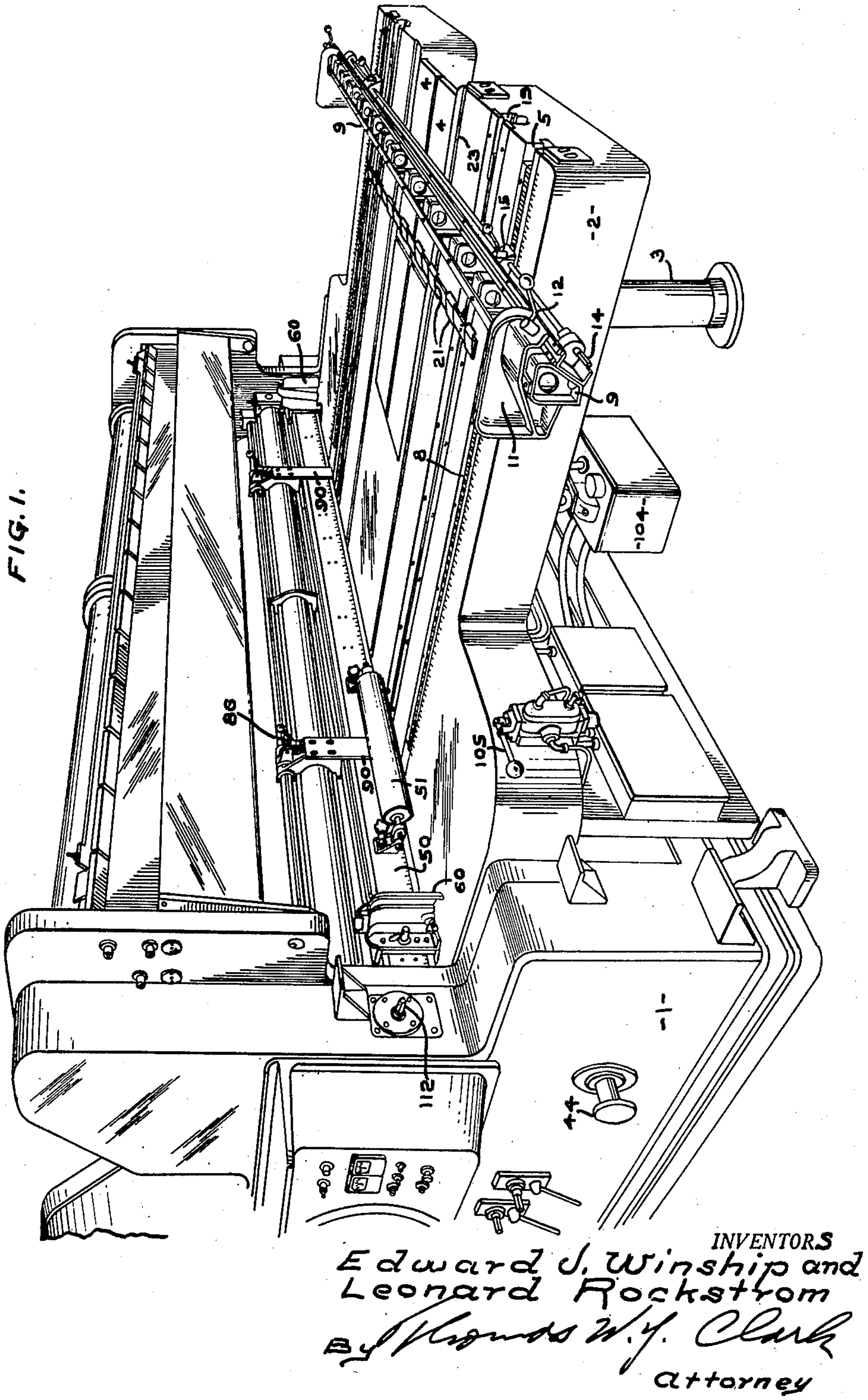
Figure 1 is a side perspective view of the printer-slotter showing the blank support and feed mechanism at the right.
Figures 2, 9, 10:
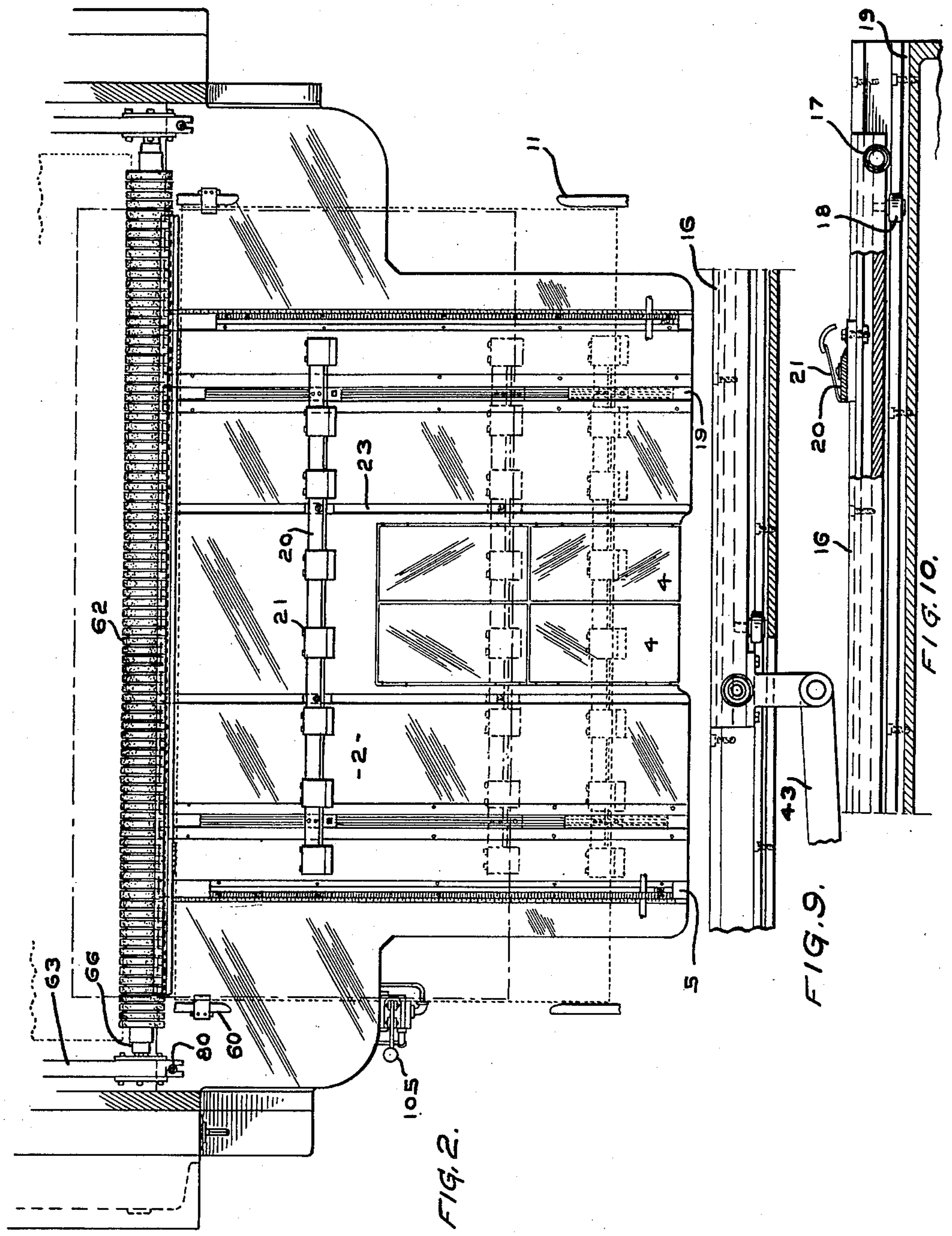
Figure 2 is a top plan view of the blank support and feed mechanism.
Figure 9 is a fragmentary longitudinal elevational view of one of the pull rods.
Figure 10 is a similar view to the right of Figure 9.
Figures 3, 24A:
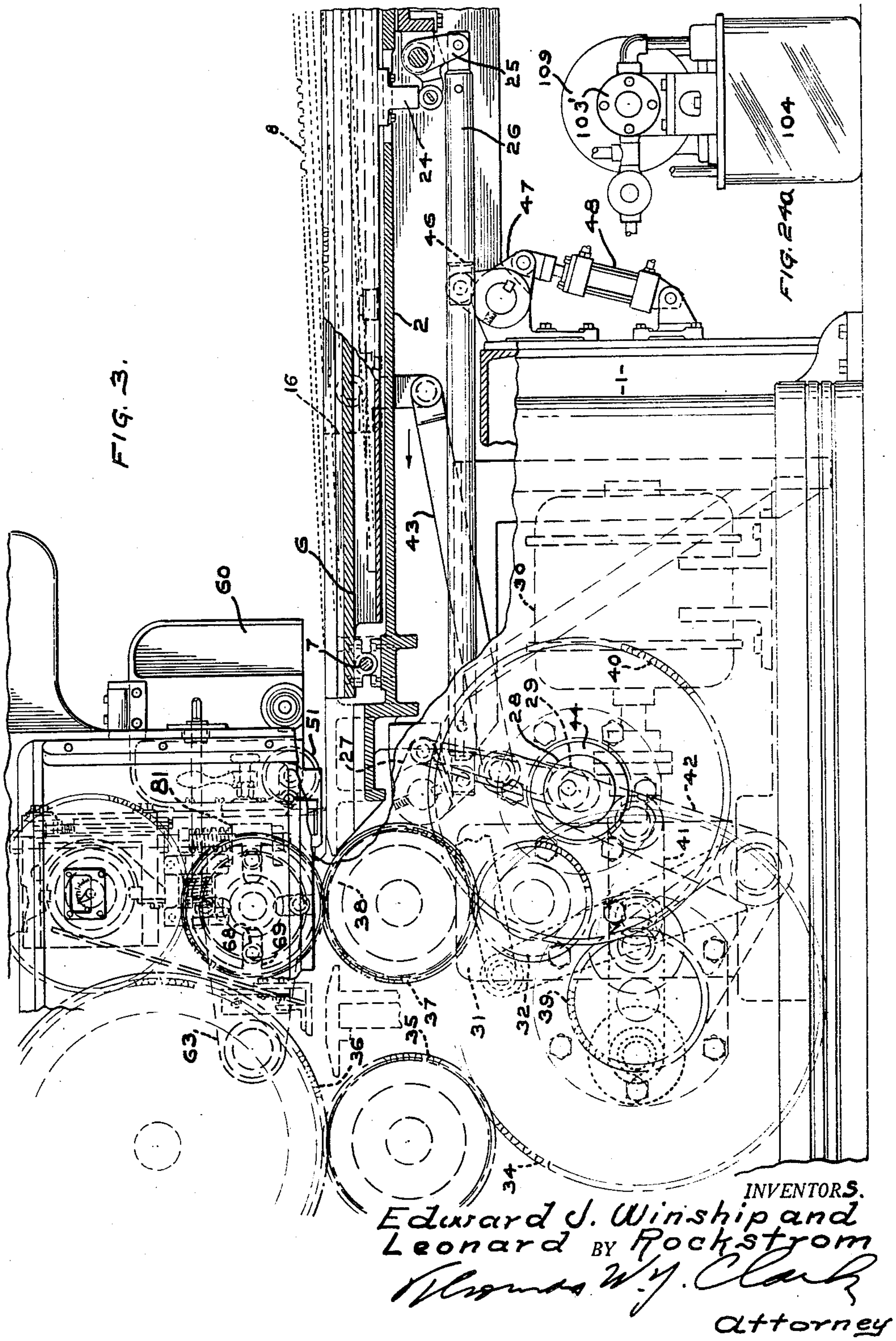
Figure 3 is a partial side elevational view partly in section of the feed side of the printer-slotter.
Figure 4:
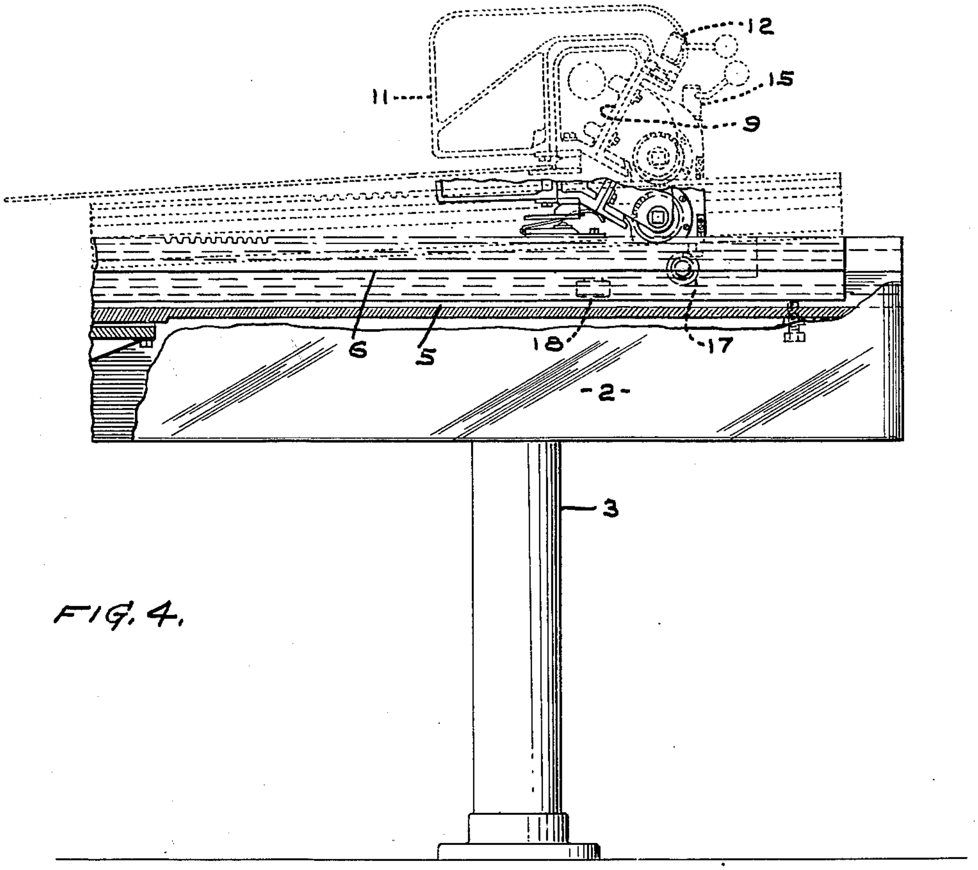
Figure 4 is a continuation of the blank support of Figure 3 to the right.
Figure 21:
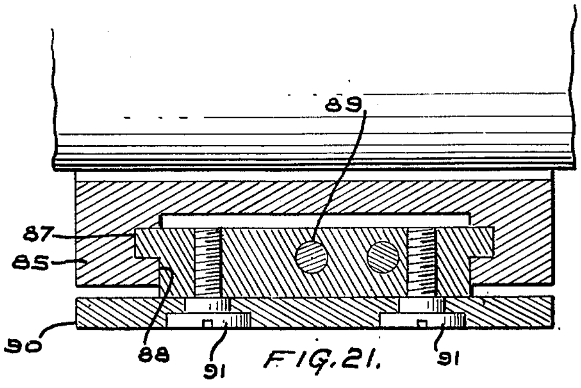
Figure 21 is a sectional view on line 21—21 of Figure 13.
Figure 5:
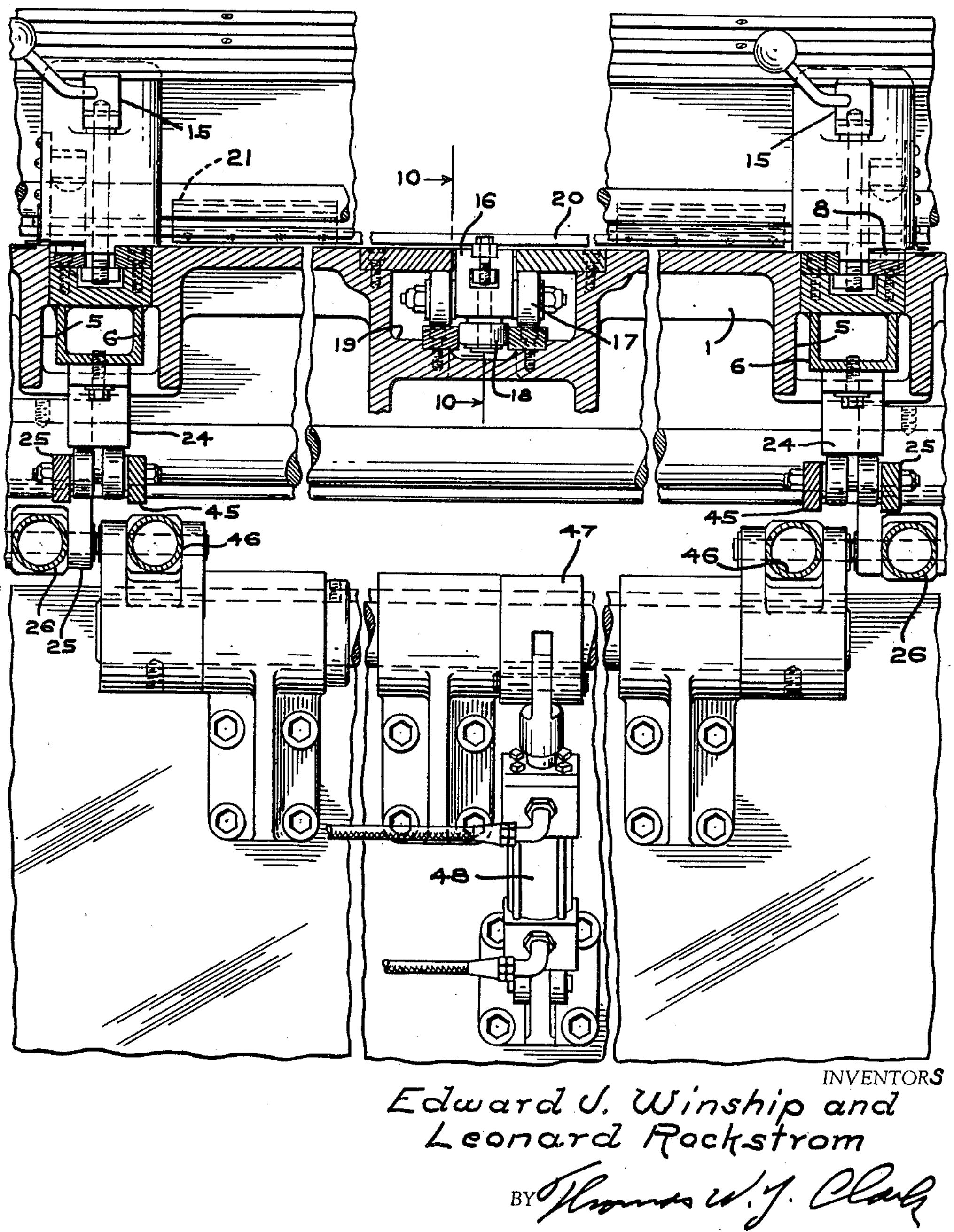
Figure 5 is a transverse sectional view of the blank support and of the blank feeding and front elevating mechanism.
Figures 6, 7:
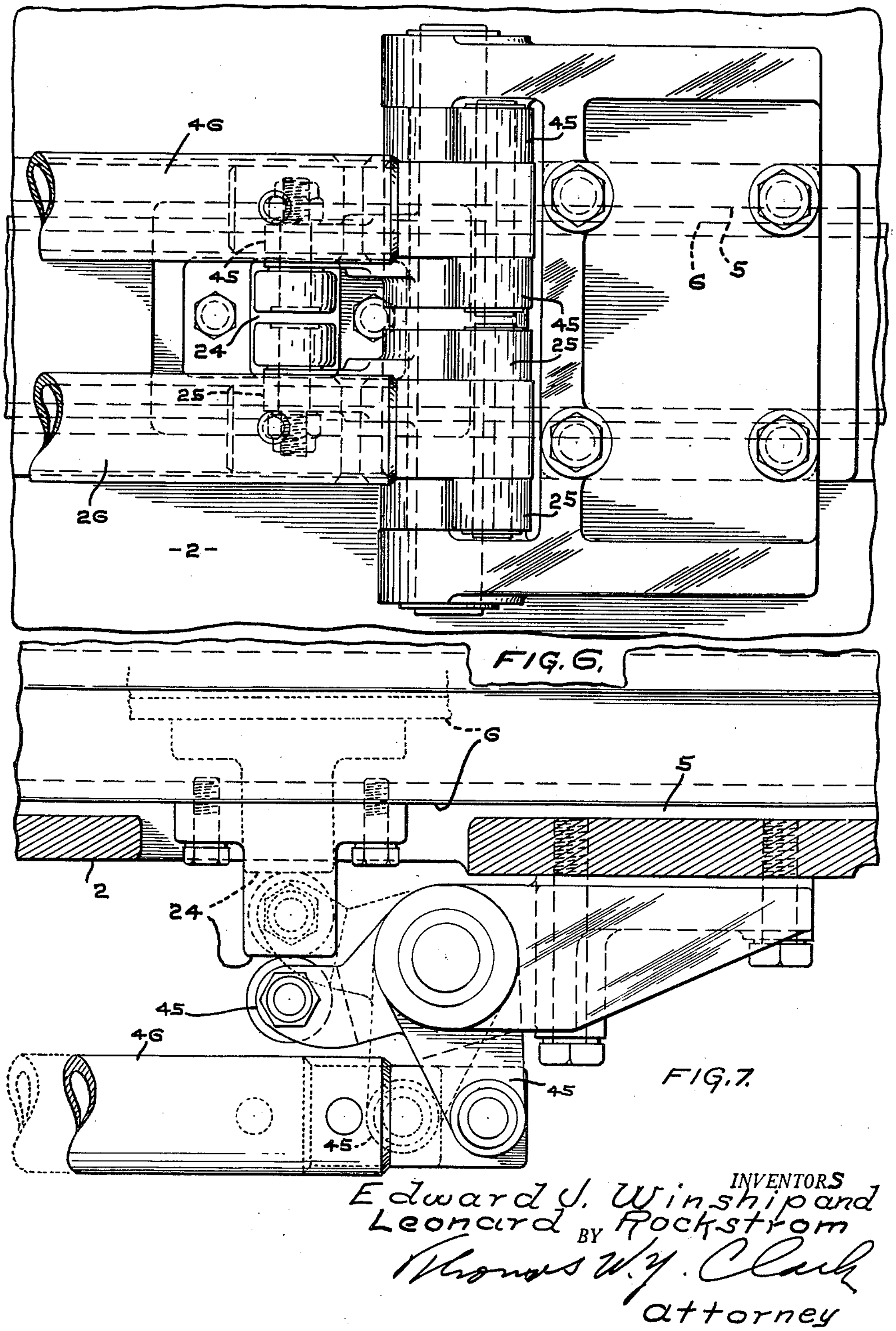
Figure 6 is a fragmentary inverted plan view of the dual blank front elevating mechanism.
Figure 7 is a side elevational view partly in section of the parts shown in Figure 6.
Figures 8, 11, 12:
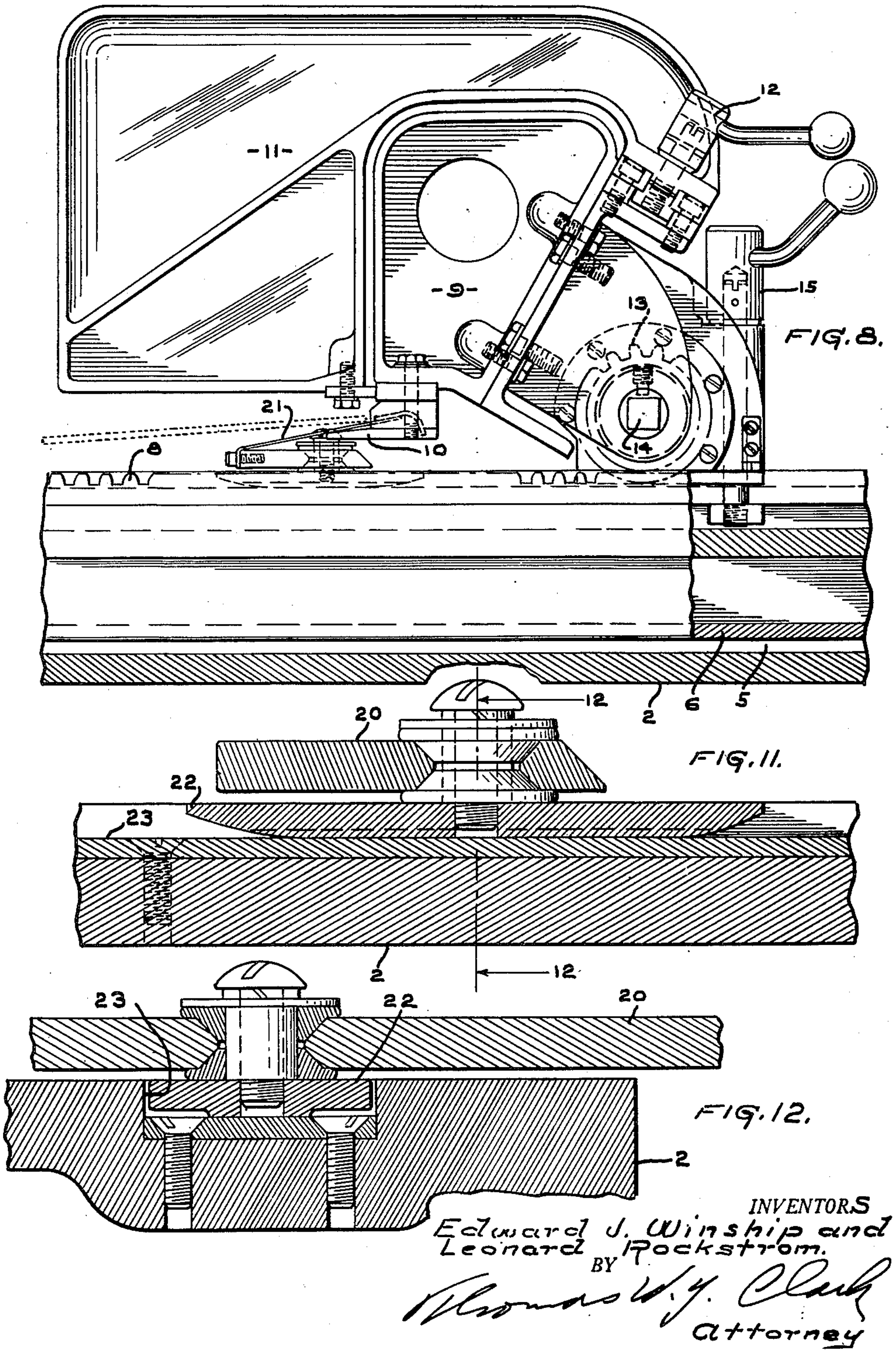
Figure 8 is a side elevational view partly in section of the blank front edge aligning and supporting device.
Figure 11 is a longitudinal sectional view of an intermediate pull bar support.
Figure 12 is a sectional view at right angles to Figure 11 of the same support.
Figure 13:
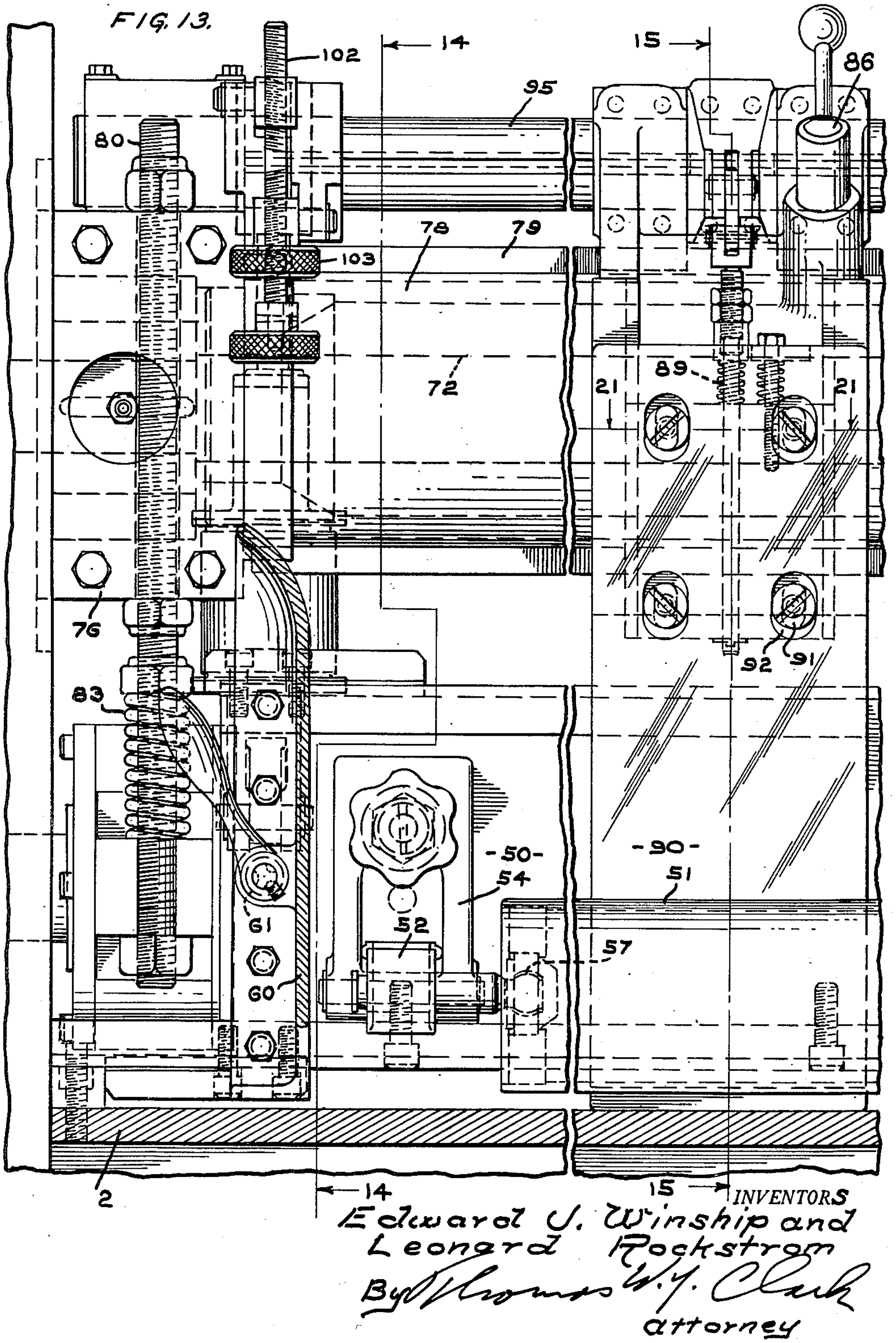
Figure 13 is a partial transverse elevational view, partly in section, of the left side of the printer slotter at the blank feeding end.
Figure 14:
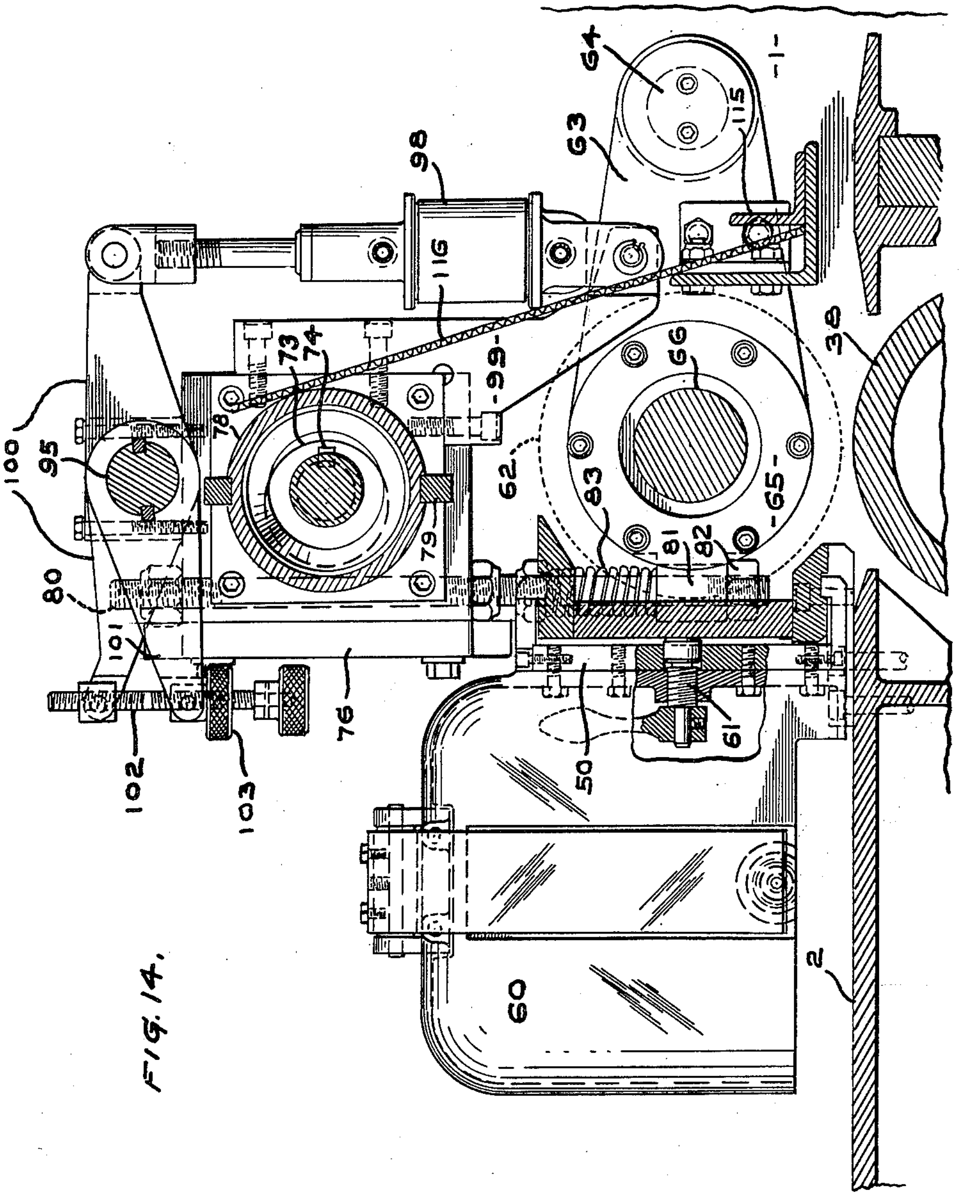
Figure 14 is a cross-sectional view on the line 14—14 of Figure 13 in the direction of the arrows.
Figures 17, 24:
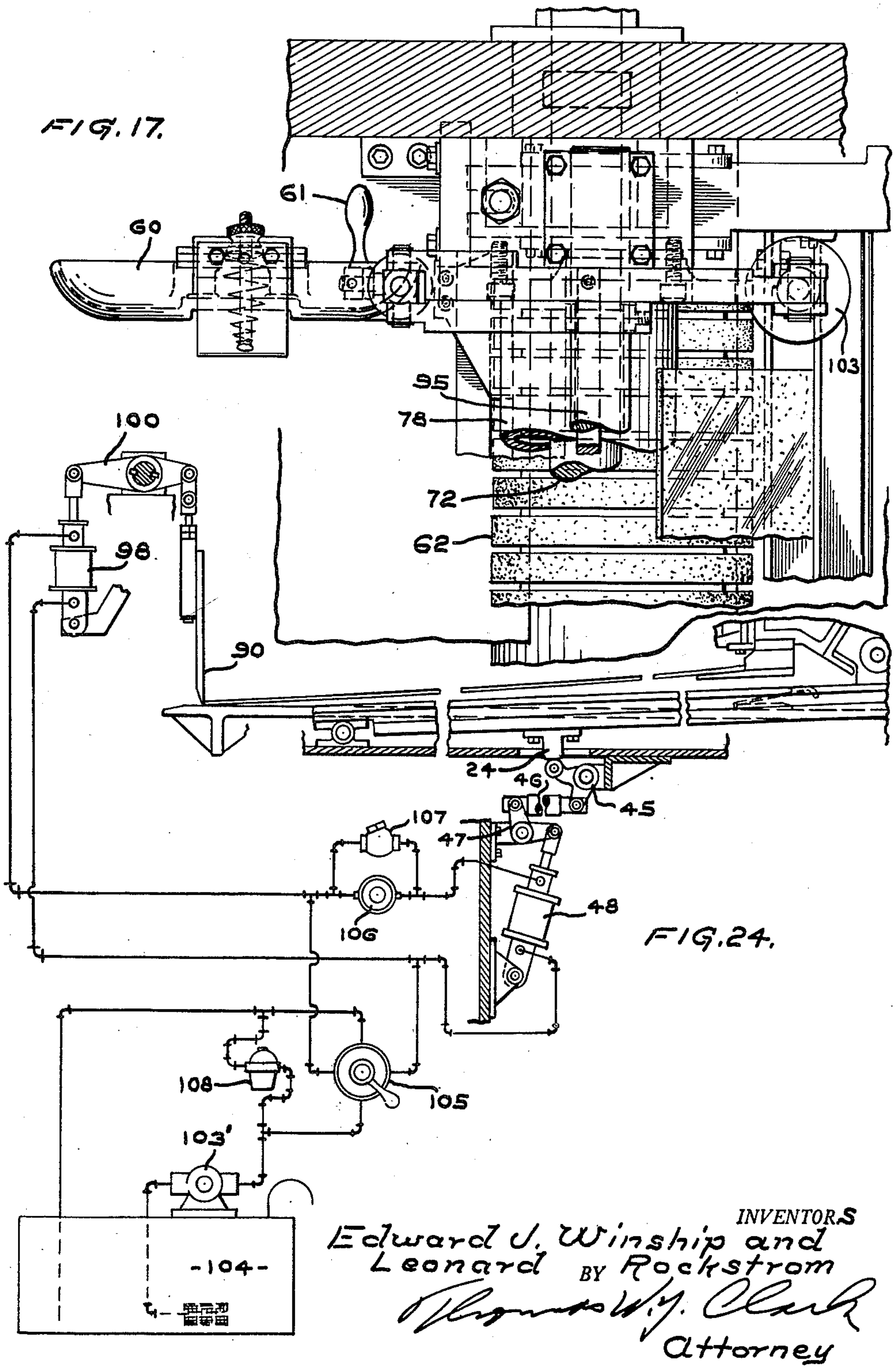
Figure 17 is a partial top plan view, partly in section of the portion of the machine shown in Figure 14.

Figures 24 and 24*a* are diagrammatic views partly in section of the blank and gate elevating and lowering mechanism power unit.

In the drawings similar numerals refer to similar parts throughout the several views.

The rear of the printer-slotter frame 1 is the feed table or blank or board support 2, mounted on the frame and having additional pedestals 3. The support 2 has opening doors 4 in its center which may be swung down when the machine is used for narrower boards to allow the operator to come up closer to the center of the table support.

The support has in its bed grooves 5 for the reception therein of carrier bars 6 which are pivoted at their forward ends 7. These bars have racks 8 on one side. The bars support the lifting or cross bar 9 having holding fingers 10 projecting rearwardly from the underside thereof. The lifting bars 9 have side guides 11 adjustable transversely of the bar by means of clamping screws 12. The lifting bars have pinions 13 which mesh with the racks 8, and by means of which the lifting bar 9 may be moved longitudinally of the carrier bars 6, the pinions being mounted on shaft 14 and the lifting bars being clamped to the carrier bars 6 by means of clamping screws 15.

Feed bars 16 mounted on horizontal and vertically bearing rollers 17 and 18 respectively move back and forth in channels 19 on each side of the blank support 2. These feed bars carry transverse feed bar 20 at their rear ends and the feed bar 20 has feed members 21 spaced across its length. These members slide under the blank or stack of blanks and pull the blank back to the pull rolls for entry into the printer-slotter. Since in the instant machine the transverse feed bar 20 is unusually long it has intermediate slides 22 riding in grooves 23 in the support 2.

The carrier bars 6 have on their under sides lugs 24 projecting beneath the support 2. These lugs are raised by bell cranks 25 attached to pull rods 26. The other end of the pull rods 26 are likewise mounted on bell cranks 27 which are rocked by lever 28 connected to eccentric 29.

The printer slotter is driven by a motor 30 connected through a reduction gearing 31 to a gear 32 driving gear 37 on the shaft of which is mounted another gear driving larger gear 34 which drives the lower gear 35 which in turn drives the upper gear 36, gears 35 and 36 being connected to the shafts of the initial printing cylinders of the machine.

On the shaft of gear 37 is the lower pull roll 38. Gear 39 likewise on the shaft with gear 34, drives larger gear 40 which carries the eccentric 29 rocking the pull rods 26.

On gear 34 is pivoted crank connecting rod 41 connected to rocking lever 42 connected at its free extremity to connecting rod 43 to reciprocate the feed bars 16. A clutch 44 connects or disconnects the eccentric 29 from its driving relation with large gear 40 and the diameters of the respective gears are such as to rock the pull rods 26 with every alternate stroke of the connecting rod 43 when the clutch connects the eccentric drive with the pull rods 26.

The lugs 24 have further bell cranks 45 to elevate them. These bell cranks 45 support and are moved by pull rods 46 at one end and at the other end the pull rods 46 are supported by bell cranks 47 on the frame 1 of the machine and these bell cranks 47 are rocked by hydraulic cylinder 48.

Figure 15:
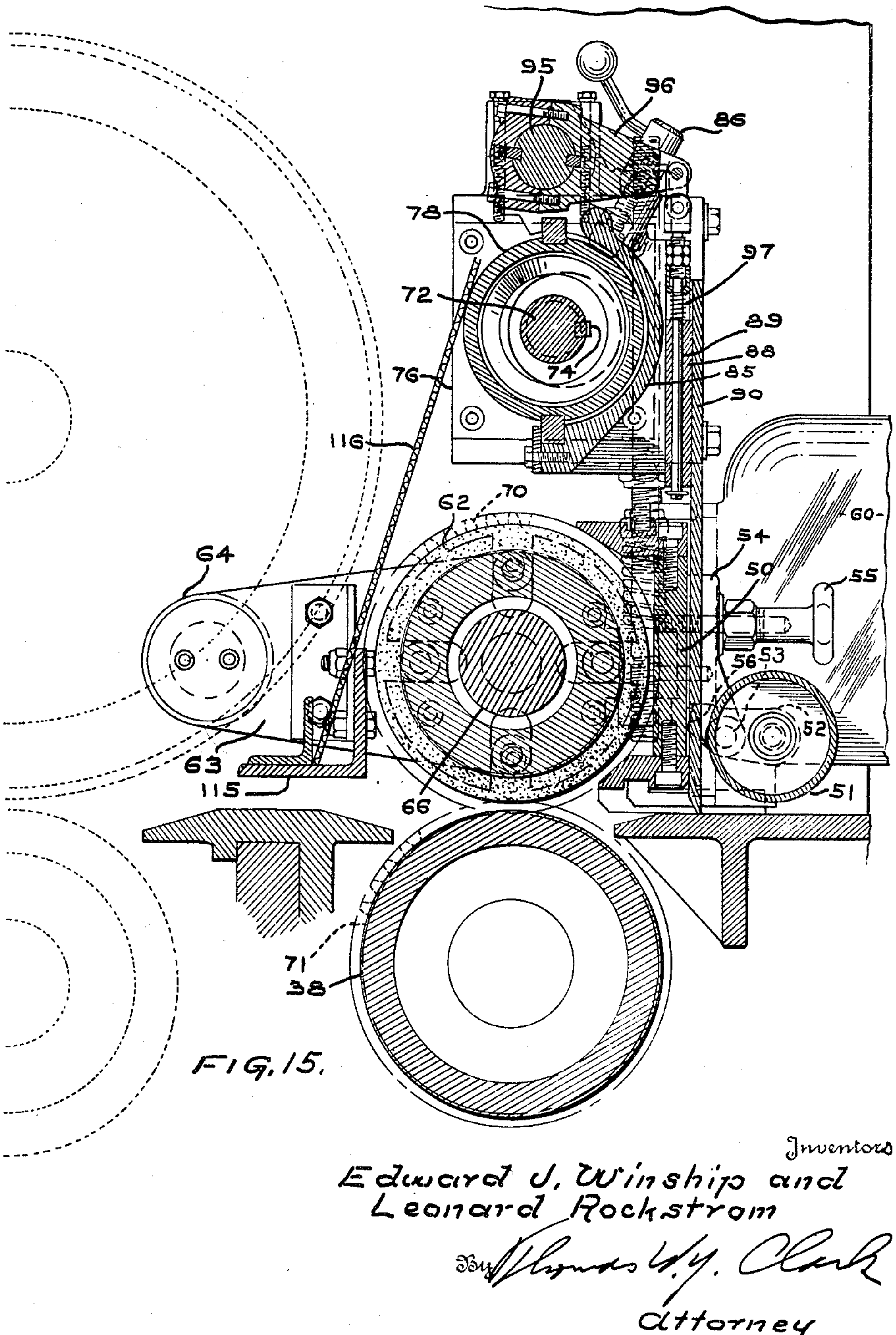
Figure 15 is a sectional view on line 15—15 of Figure 13 in the direction of the arrows.

A toe guard 50 extends across the machine at the rear of the blank support 2. At times the excessively large blanks are so warped as to make it desirable to attach additional hold down rolls 51 to the guard 50. These hold down rolls are mounted at each end on a lever 52 pivoted at 53 to a bracket 54 which, by means of a screw clamp 55 attaches the hold down roll 51 to the guard 50. The hold down rolls mounting lever 52 has a projecting end 56 which serves to limit the vertical movement of the rolls 51 as the end 56 bears against the guard 50, as shown in Figure 15. The hold down rolls 51 are mounted through a bearing 57 in the lever 52 to allow for universal movements of the hold down rolls. There may be one of these rolls, as shown, or more placed across the toe guard to guide warped board under the guard.

Inner side guides 60 may be clamped to the guard 50 by means of screws 61 and these side guides as well as the hold down rolls may be placed transversely of the machine across the guard 50 as the size and need of the blanks being fed suggest.

The rubber coated upper pull roll 62 is mounted at each end in arms 63, these arms being pivotally mounted in side frame 1 at their forward ends 64. At their free ends the arms carry bearings 65 in which the shaft 66 of the pull roll 62 is mounted. On the right side of the machine the shaft 66 passes through a large opening in the frame 1 and it carries a plate 67 supporting four rollers 68 which are rotated, to rotate the shaft 66, by means of plate 69 attached to and driven by gear 70 which in turn is driven by gear 71 from the shaft of the lower pull roll 38.

Figure 16:
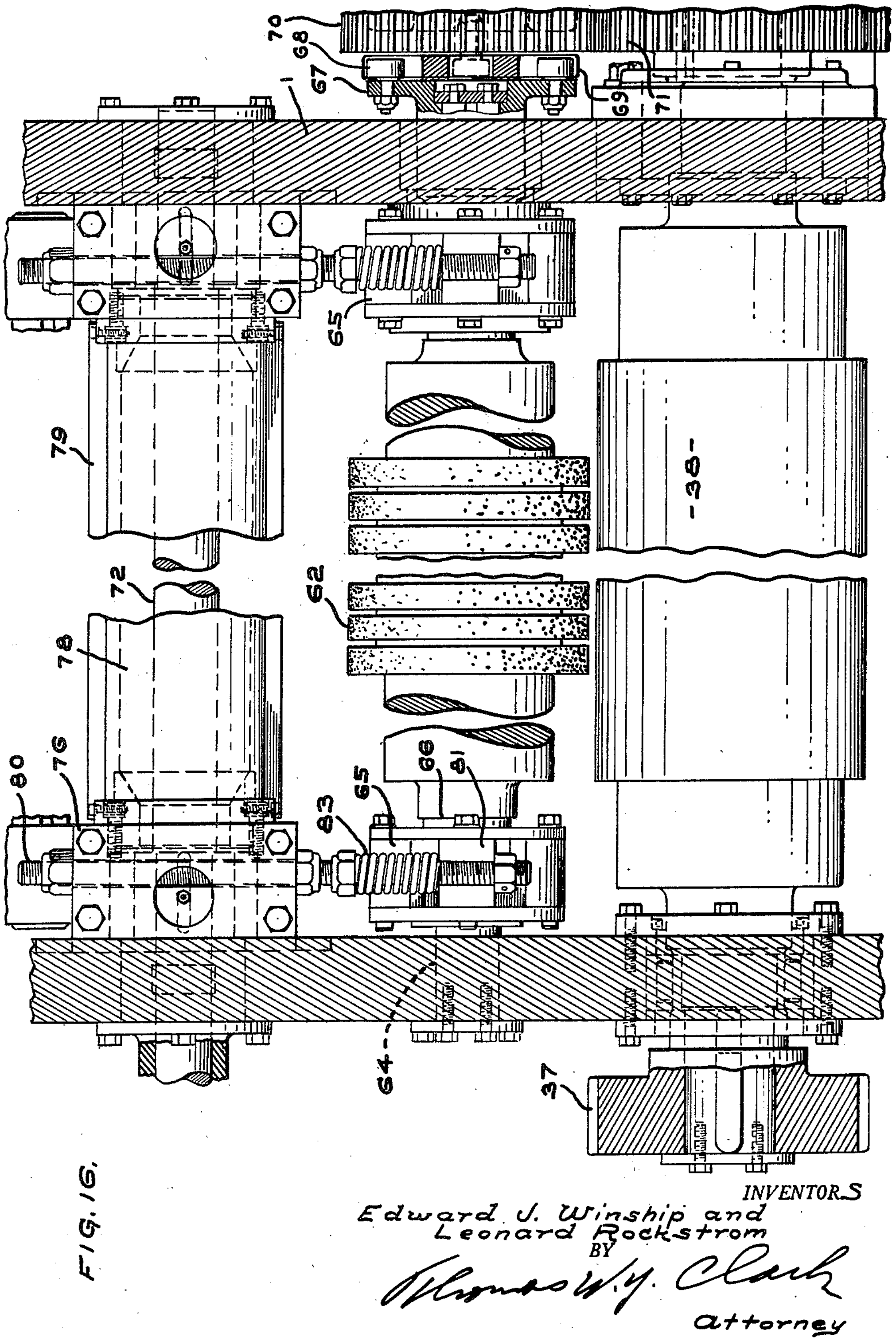
Figure 16 is a transverse elevational view partly broken away and partly in section, of the pull rolls and their mounting.
Figures 18, 19:
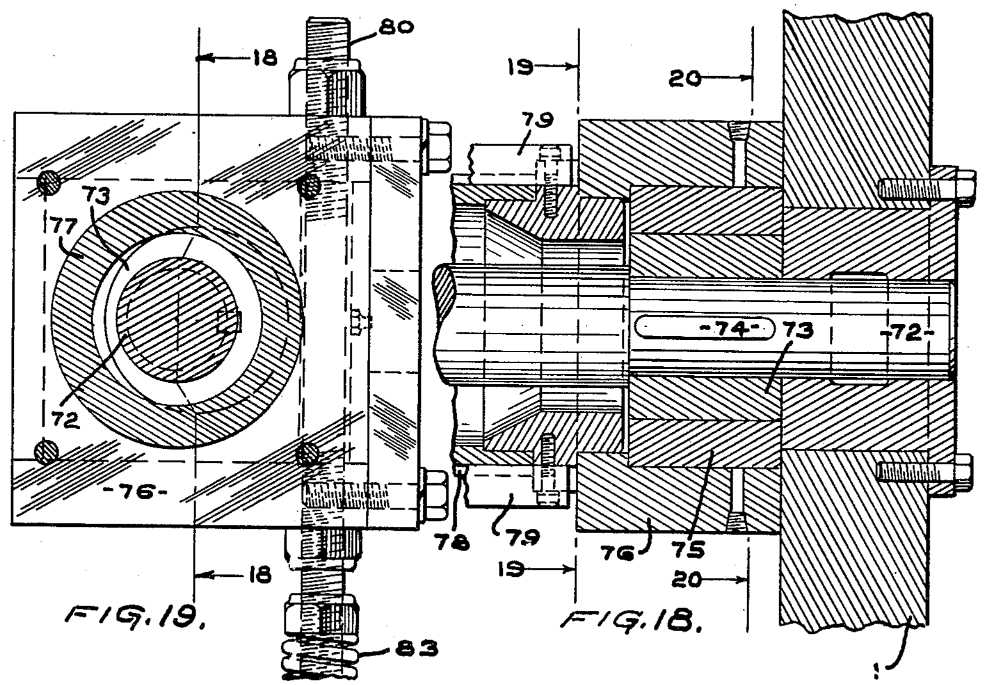
Figure 18 is a fragmentary sectional view of the right end of the pull roll and gate support on line 18—18 of Figure 19.
Figure 19 is a sectional view on line 19—19 of Figure 18.
Figure 20:
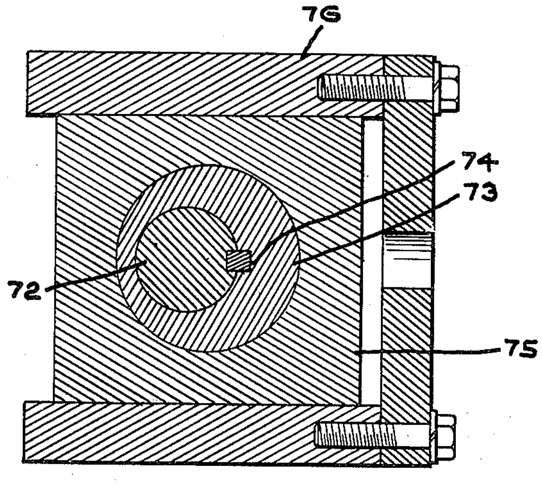
Figure 20 is a partial sectional view on line 20—20 of Figure 18.
Figures 22, 23:
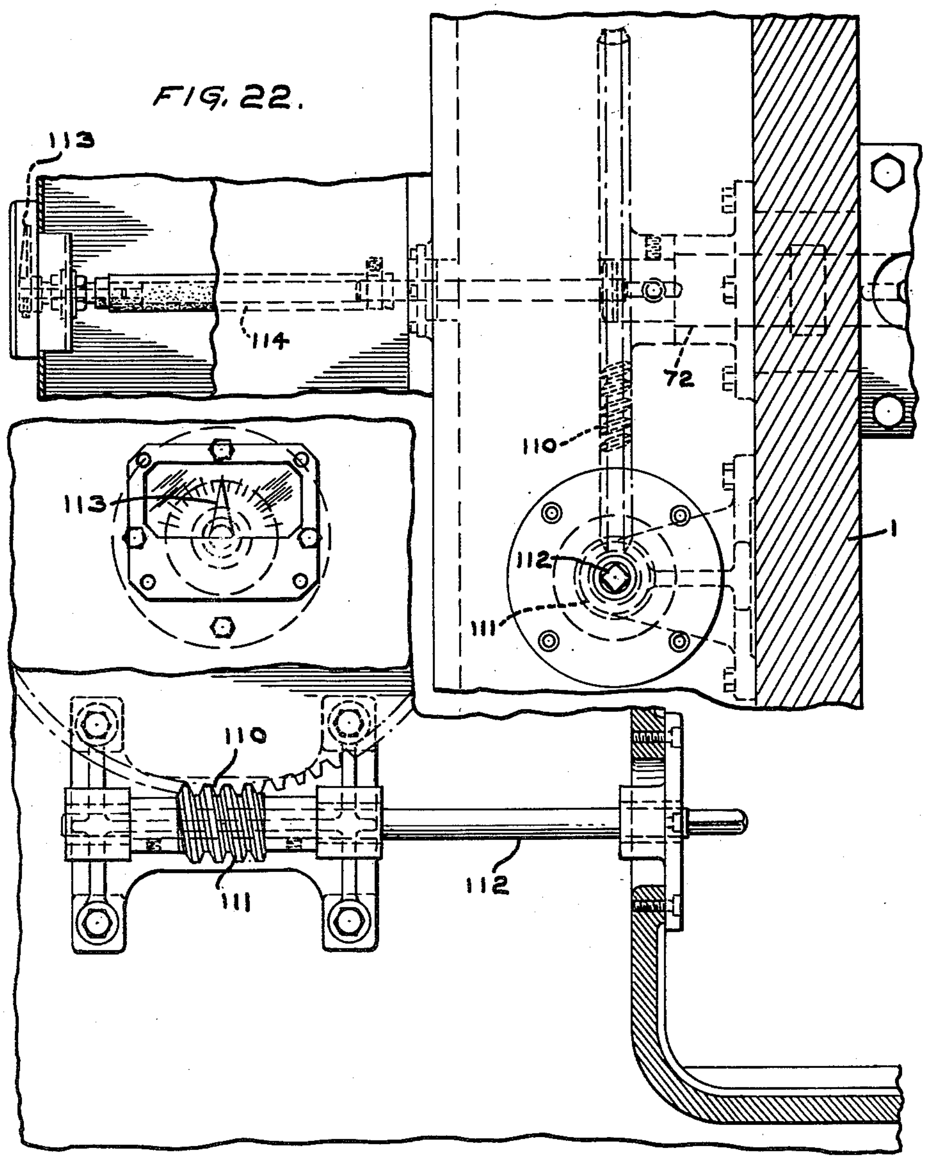
Figure 22 is a fragmentary partially sectional transverse elevational view of the pull roll and gate adjusting mechanism.
Figure 23 is a view at right angles to Figure 22 of the adjusting mechanism.

Likewise extending across the machine and mounted in the side frame 1 is a shaft 72. This shaft 72 carries at each end an eccentric 73 with a key 74 to turn the eccentric by the shaft. The eccentric 73 in turn is mounted in block 75 which slides freely horizontally in the housing 76. Housing 76 has a circular opening therein, with tubular section 77 fitting therein as shown in Figures 18 and 19 and over the opposite end of tubular section 77 is mounted tube 78 extending across the machine to the other similar tubular section in a similar housing 76. The tube 78 and the tubular section 77 have keys 79 diametrically appositely secured thereto. The block 75 will be moved horizontally, backward and forward in the housing 76; and the housing 76 will be moved vertically, up and down, the front plate of the housing 76 sliding in guides in the machine frame 1, when the eccentric 73 is rotated as shown in Figures 16 and 17. This motion will cause the gate members or stops 90 and the upper pull roller 62 to rise or fall.

Rods 80 extend through housings 76 and pass through lugs 81 on the free ends of arms 63. These rods 80 are longitudinally rigidly fixed in housing 76 by nuts as shown and they pull upwardly on the arm 63 by the nuts 82 and springs 83 bear down on the lugs so that the force lifting the arms 63 into carrying the upper pull roll 62 upwardly is rigid but the pressure down is resilient.

Two spaced saddles 85 are slidable across the tube 78 on the keys 79 and they are fixedly adjustable thereon by clamping screws 86 as shown in Figure 15. These saddles contain ways 87 with slides 88 therein which are held up by rods 89 passing therethrough. On the faces of the two spaced saddles 85 are fixed stop members 90 forming the gate to prevent the entry of blanks to the pull rolls when the stop members are down or to limit the passage of more than one blank to the pull members when the stop members are up. These stop members are individually adjustable on the slides 88 by means of screws 91 passing through elongated openings 92 in the stop members 90.

Extending across the machine immediately above shaft 72 is a rock shaft 95, this shaft having levers 96 keyed thereto and to the free end of these levers is attached the upper ends of rods 89 to hold the stop members suspended therefrom. The stop members are pushed resiliently downward by the rods 89 through means of springs 97 surrounding the rods and bearing upon the slides 88 to which the stop members are attached. The keys attaching the levers 96 to the shaft 95 so that the levers rock with the shaft, extend all the way across the shaft 95 to allow for the transverse adjustment across the machine of the stop members 90 forming the gate.

To one of the housings 76 one end of a hydraulic cylinder 98 is attached by means of bracket 99. A lever 100 is mounted to freely rotate the shaft 95. This lever 100 is adjustably keyed to the keys of shaft 95 through means of lever 101 mounted on the keys of the shaft 95 and the lever 101 is attached to one end of the lever 100 by means of the double threaded screw 102 having the lock nut 103 thereon. This adjustment is on the side of the machine and can be readily reached to permit quick adjustment of the gate movement in response to the action of the hydraulic cylinder 98.

A schematic view of the operation of the gate and the blank raising mechanism is shown in Figure 24. The pump 103' takes fluid from reservoir 104 and passes it to four-way valve 105 from which the fluid may go to cylinder 48 to raise the lifting cross bar 9 and at the same time to lower the gate 90. When the four-way valve 105 is reversed fluid drains back to the reservoir 104 and it is pumped to the cylinder 98 to raise the gate and through means of sequence valve 106 the passage of fluid to the lifting bar is slower and that bar is lowered after the gate is open. The line to lower the lifting bar contains a check valve 107 to permit rapid exhaust of fluid when the lifting bar is being raised. The fluid line likewise has a relief valve 108 therein, and a motor 109 operates pump 103'.

Shaft 72 projects through the side of the machine frame 1 and it has thereon large gear 110 and worm 111 on shaft 112 is likewise attached to the side of the frame of the machine by which to turn gear 110 to vary the vertical position of the upper pull roll through means of eccentric 73. Shaft 72 is connected to a hand 113 by means of flexible hose 114 to indicate the elevation of the upper pull roll.

The upper roll 62 mounted on the arms 63 is rubber covered and is in such close proximity to the upper printing cylinder that ink is frequently thrown against the rubber pull roll which causes its rapid deterioration. To avoid this damage brackets 115 are mounted on each of the arms 63 and in these brackets is placed a disposable guard 116 which may bear against the tube 78 and it is adjustable up and down along with the arms 63.

From the above detailed description it will be apparent that the machine of this invention will not only operate on the smaller sheets of corrugated board but that it will operate on the medium sized sheets utilizing the skip feed and also on the excessively large sheets which require two men to place them on the machine and to align them before allowing them to be fed by the reciprocating feed. Although these large sheets may be substantially warped the hold down rolls may be placed across the toe guard to assure that the warped sheets successfully pass the toe guard for entry between the pull rolls. When feeding these unusually large sheets the hand valve is turned to lower the gate and raise the lifting bar so that the next sheet may be properly aligned against the gate.

It will be apparent that many modifications may be made in the detailed construction above described without departing from the invention as defined in the following claims.

What is claimed as new and is desired to be secured by Letters Patent is:

1. In a blank sheet feeding mechanism, means for supporting a blank, a vertically adjustable gate above and forward of said support means to move the gates vertically independently of its adjustment, a feed member constantly reciprocating on the support for engaging a blank and advancing it over said support and under said gate, means to raise the rear edge of a blank, out of engagement with said feed member, means independent of the movement of the feed member to coordinate the blank raising means with the independent gate raising and lowering means, to raise the gate when the blank raising means is lowered to engage a blank with the feed member.

2. A blank sheet feeding mechanism having means for supporting a blank, pull rolls forward of the support, a vertically movable gate above the support and between the support and rolls, means to adjust the spacing of the rolls and the opening extent of the gate to correspond to the blank thickness, a shaft extending over the support parallel to the rolls, means carried by said adjusting means and shaft to raise and lower the gate independently of its adjusted position as effected by said adjusting means, a feed member constantly reciprocating on the support for engaging a blank and advancing it under the gate and to the feed rolls, means independent of the movement of the feed member to raise the rear edge of a blank, out of engagement with the feed member and means to coordinate the blank raising means with the independent gate raising and lowering means, to raise the gate when the blank raising means is lowered to engage a blank with the feed member.

3. A blank sheet feeding mechanism having means for supporting a blank, pull rolls forward of the support, a gate above the support and between the support and rolls, means to vertically adjust the spacing of the upper pull roll in relation to the lower, and simultaneously to adjust the vertical position of the gate to correspond to the blank thickness, a feed member for engaging a blank to advance it under the gate to the feed rolls, a shaft extending over the support parallel to the rolls and means carried by said adjusting means and shaft to raise and lower the gate independently of its adjusted position as effected by said adjusting means.

4. A blank sheet feeding mechanism having means for supporting a blank, pull rolls forward of the support, a vertically movable gate above the support and between the support and rolls, means to vertically adjust the spacing of the upper pull roll in relation to the lower, and simultaneously to adjust the vertical position of the gate to correspond to the blank thickness, a shaft extending over the support parallel to the rolls, means carried by said adjusting means and shaft to raise and lower the gate independently of its adjusted position as effected by said adjusting means, a feed member constantly reciprocating on the support for engaging a blank to advance it under the gate to the feed rolls, means independent of the movement of the feed member to raise the rear edge of a blank, out of engagement with the feed member and means to coordinate the blank raising means with the independent gate raising and lowering means, to raise the gate when the blank raising means is lowered to engage a blank with the feed member.

5. A blank sheet feeding mechanism, means supporting a blank, a feed member constantly reciprocating on the support for engaging a blank and advancing it over said support, drive means operating said feed member, a plurality of means to raise the rear edge of the blank out of engagement with said feed member, and means to coordinate one of said blank raising means with the feed member drive means, another of said blank raising means being operable to raise the blank from the feed member independently of the feed member drive means.

6. A blank sheet feeding mechanism having means for supporting a blank, pull rolls forward of the support, a pair of shafts parallel to and adjacent the rolls, above the support, a plurality of stop members comprising a gate supported on one of said shafts, said members being movable lengthwise of said shaft, means operable through the second of said shafts to adjust the vertical position of the gate to correspond to the thickness of the blank, a feed member for engaging a blank to advance it under the gate of the pull rolls, a third shaft extending over the support parallel to the rolls and means carried by said one shaft and said third shaft to raise and lower the gate independently of its adjusted position as effected by said adjusting means.

7. A blank sheet feeding mechanism having means for supporting a blank, pull rolls forward of the support, a pair of concentric shafts parallel to and adjacent the rolls, above the support, a plurality of stop members comprising a gate supported on one of said shafts, said members being movable lengthwise of said shafts, means operable through the second of said shafts to adjust the vertical position of the gate to correspond to the thickness of the blank, a third shaft extending over the support parallel to the rolls, separate means carried by said one shaft and said third shaft to lower the gate to the support and raise it therefrom independently of said second shaft and a feed member for engaging a blank to advance it under the gate to the pull rolls.

8. A blank sheet feeding mechanism having means for supporting a blank, a lower pull roll and a parallel upper floatingly mounted pull roll, said rolls being positioned forward of the support, a shaft parallel to and adjacent the rolls, above the support, a plurality of stop members comprising a gate supported by said shaft, said members being movable lengthwise of said shaft, means operable through said shaft to adjust the vertical position of the gate and of said floating roll simultaneously to correspond to the thickness of a blank, a second shaft extending over the support parallel to the rolls, a feed member for engaging a blank to advance it under the gate to the pull rolls and means carried by said shafts to raise and lower the gate independently of its adjusted position as effected by said adjusting means.

9. A blank sheet feeding mechanism having means for supporting a blank, a lower pull roll and a parallel upper floatingly mounted pull roll, said rolls being positioned forward of the support, a shaft parallel to and adjacent the rolls, above the support, a plurality of stop members comprising a gate supported by said shaft, said members being movable lengthwise of said shaft, means connecting said shaft to said gate and resiliently to said floating pull roll to adjust their vertical position simultaneously to correspond to the thickness of a blank, a second shaft extending over the support parallel to the rolls, a feed member for engaging a blank to advance it under the gate and to the pull rolls and means carried by said shafts to raise and lower the gate independently of its adjusted position as effected by said adjusting means.

10. A blank sheet feeding mechanism having means for supporting a blank, pull rolls forward of the support, a pair of shafts parallel to and adjacent the rolls, above the support, a plurality of stop members comprising a gate supported on said shafts, said members being movable lengthwise of said shafts, means operating between said shafts to lower the gate resiliently to the support and raise it therefrom, a third shaft extending over the support parallel to the rolls, a feed member for engaging a blank to advance it under the gate to the pull rolls and means carried by one of said pair of shafts and said third shaft to raise and lower the gate independently of its adjusted position as effected by said first lowering and raising means.

11. A blank sheet feeding mechanism having means for supporting a blank, pull rolls forward of the support, a pair of shafts parallel to and adjacent the rolls, above the support, a plurality of stop members comprising a gate supported on one of said shafts, said members being movable lengthwise of said shaft, means carried by said one shaft to adjust the gate vertically and means independent of said adjusting means operating between said shafts to lower the gate resiliently to the support and raise it therefrom, a feed member constantly reciprocating on the support for engaging a blank to advance it under the gate to the pull rolls, means independent of the movement of the feed member to raise the rear edge of a blank, out of engagement with the feed member and means to coordinate the blank raising means with the independent gate lowering and raising means, to raise the gate when the blank raising means is lowered to engage a blank with the feed member.

12. A blank sheet feeding mechanism having means for supporting a blank, spaced bars in the support surface pivoted at their forward ends, pull rolls forward of the support, a vertically adjustable gate above the support and between the support and rolls, means to move the gates vertically independently of its adjustment, a constantly reciprocating feed member for engaging a blank and advancing it under the gate to the feed rolls, a transversely extending member supported on said bars adjacent the rear edge of a blank having means thereon to support the rear edge of a blank, means independent of the movement of the feed member to raise said bars to raise the blank from engagement with the feed member, and means to coordinate the independent gate movement with the movement of the bars, to raise the gate when the bars are lowered.

13. A blank sheet feeding mechanism having means for supporting a blank, pull rolls forward of the support, a pair of shafts parallel to and adjacent the rolls, above the support, a plurality of stop members comprising a gate supported on one of said shafts, said members being movable lengthwise of said shaft, means carried by said one shaft to adjust the gate vertically and means independent of said adjusting means operating between said shafts to lower the gate to the support and raise it therefrom, a feed member constantly reciprocating on the support for engaging a blank to advance it under the gate to the pull rolls, spaced bars in the support surface, a transversely extending member supported on said bars adjacent the rear edge of a blank, having means thereon to support the rear edge of a blank, means independent of the movement of the feed member to raise said bars to raise the blank from engagement with the feed member, and to lower the bar for such engagement, whereby the blank may be fed to the pull rolls.

References Cited in the file of this patent

UNITED STATES PATENTS

| | | |
|---|---|---|
| 1,251,852 | Winkley | Jan. 1, 1918 |
| 1,756,073 | Swift | Apr. 29, 1930 |
| 1,873,234 | Wood | Aug. 23, 1932 |
| 2,256,244 | Fitchett | Sept. 16, 1941 |
| 2,289,010 | Greenwood | July 7, 1942 |